United States Patent
Krishna et al.

(10) Patent No.: US 7,236,550 B1
(45) Date of Patent: Jun. 26, 2007

(54) METHOD AND APPARATUS FOR TAIL CANCELLATION EQUALIZATION

(75) Inventors: Kannan Krishna, Portland, OR (US); Jeffrey Lee Sonntag, Portland, OR (US); John Theodore Stonick, Portland, OR (US)

(73) Assignee: Synopsys, Inc., Mountain View, CA (US)

( * ) Notice: Subject to any disclaimer, the term of this patent is extended or adjusted under 35 U.S.C. 154(b) by 289 days.

(21) Appl. No.: 10/979,031

(22) Filed: Nov. 1, 2004

(51) Int. Cl.
*H04B 1/10* (2006.01)

(52) U.S. Cl. ............... 375/350; 375/232; 375/233; 375/229; 708/300; 708/322; 708/323

(58) Field of Classification Search ............ 375/229, 375/230, 232, 233, 350, 348, 214, 240; 708/322, 708/323, 300; 341/143; 330/304
See application file for complete search history.

(56) References Cited

U.S. PATENT DOCUMENTS

| 4,484,336 | A | * | 11/1984 | Catchpole et al. | .......... 375/214 |
| 5,761,243 | A | * | 6/1998 | Russell et al. | ............. 375/233 |
| 6,570,519 | B1 | * | 5/2003 | Yang | ........................... 341/143 |
| 6,580,327 | B1 | * | 6/2003 | Joffe et al. | ................... 330/304 |
| 2005/0078780 | A1 | * | 4/2005 | Chou et al. | ................. 375/350 |
| 2005/0135475 | A1 | * | 6/2005 | Momtaz et al. | ............. 375/240 |

\* cited by examiner

*Primary Examiner*—Phuong Phu
(74) *Attorney, Agent, or Firm*—Park, Vaughan & Fleming, LLP

(57) ABSTRACT

Subtraction of a signal 111 from a pulse response 110, where signal 111 provides a good approximation of the tail of pulse response 110, can provide a method for canceling the tail of pulse response 110.

For continuous data streams, signals X(t), 223 and Y(t) can correspond to, respectively, signals 110, 111 and 112. X(t) differs from 110 in being a continuous data stream. 223 differs from 111 in being the low pass filtering of X(t), such low pass filtering accomplished by a unit LPF 211. Y(t) differs from 112 in being a continuous stream of equalized data, produced by subtracting the signal at 223 from X(t).

A measurement unit 213, analysis unit 214 and decision unit 215 can act to continuously adapt LPF 211 such that tail cancellation equalization is continuously achieved.

Measurement unit 213 can construct, from Y(t), a set of correlation measurements that can be used to adapt LPF 211.

12 Claims, 10 Drawing Sheets

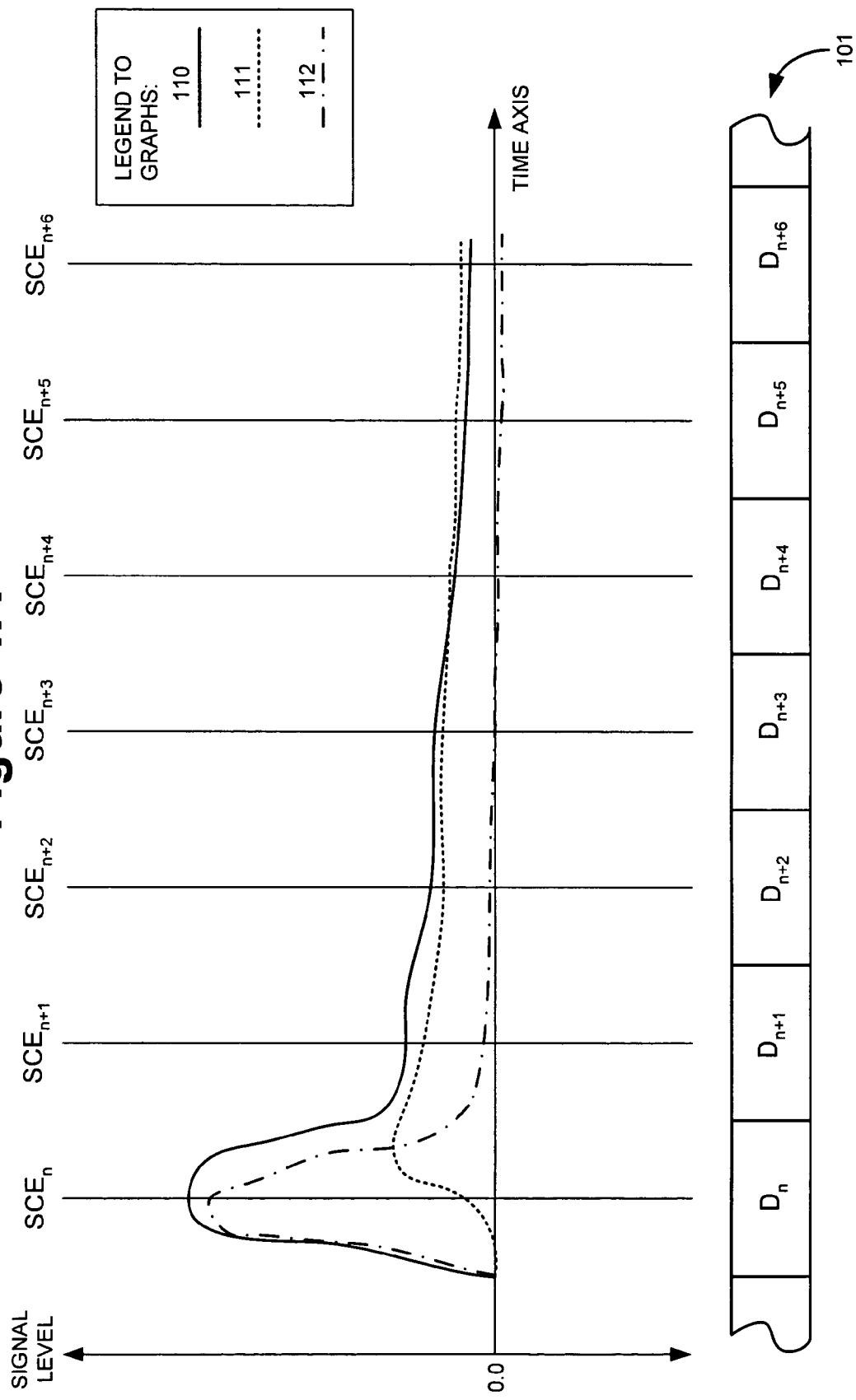

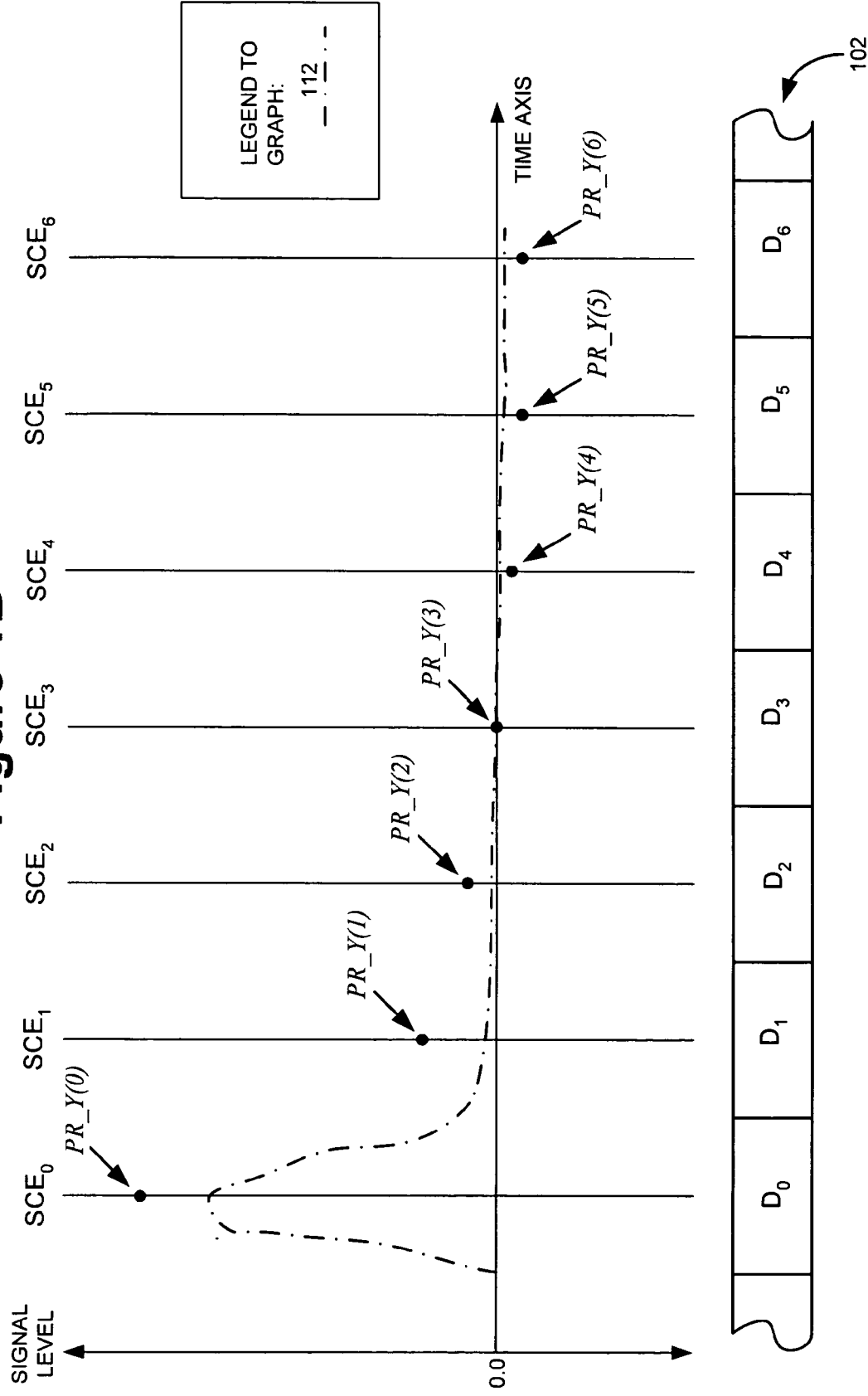

Figure 4A

```
1    /* set error slicer to an initial value */
2    error_slicer_threshold = initial_level;
3
4    /* begin loop that determines number of error slicer adjustments */
5    Repeat: i = 0;
6
7        e_to_s_corr = 0;
8
9        /* begin loop that determines number of error-slicer-to-symbol-value
10       correlations per error slicer adjustment */
11       while (i < MAX_NUM_CORRS)
12       {
13           /* following function waits for a symbol sampling clock and
14           then returns the values of the data and error slicers */
15           wait_for_symbol_clock(data_slicer_value, error_slicer_value);
16
17           if ( data_slicer_value == s )
18           {
19               i = i+1;
20               e_to_s_corr = e_to_s_corr + error_slicer_value;
21           }   /* end while */
22       }
23
24       if ( e_to_s_corr > upper_bound )
25       {
26           error_slicer_threshold = error_slicer_threshold + delta;
27           Goto Repeat;
28       }
29
30       if ( e_to_s_corr < lower_bound )
31       {
32           error_slicer_threshold = error_slicer_threshold - delta;
33           Goto Repeat;
34       }
35
36       /* If reach here, then error_slicer_threshold has been set to the
37       approximate expected signal level for symbol s */
```

Figure 4B

```
1   /* set error slicer to an initial value */
2   error_slicer_threshold = initial_level;
3
4   /* Begin loop that determines number of error slicer adjustments.  In this
5   case, number of adjustments is set by constant MAX_NUM_ADJS */
6   num_of_adjs = 0;
7   while (num_of_adjs < MAX_NUM_ADJS)
8   {
9       i = 0;
10      e_to_s_corr = 0;
11      /* begin loop that determines number of error-slicer-to-symbol-value
12      correlations per error slicer adjustment */
13      while (i < MAX_NUM_CORRS)
14      {
15          /* following function waits for a symbol sampling clock and
16          then returns the values of the data and error slicers */
17          wait_for_symbol_clock(data_slicer_value, error_slicer_value);
18
19          if ( data_slicer_value == s )
20          {
21              i = i+1;
22              e_to_s_corr = e_to_s_corr + error_slicer_value;
23          }
24      }   /* end while */
25
26      if ( e_to_s_corr > upper_bound )
27      {
28          error_slicer_threshold = error_slicer_threshold + delta;
29      }
30
31      if ( e_to_s_corr < lower_bound )
32      {
33          error_slicer_threshold = error_slicer_threshold - delta;
34      }
35
36      num_of_adjs = num_of_adjs + 1;
37  }   /* end while */
38
39  /* When reach here, error_slicer_threshold has been adjusted
40  MAX_NUM_ADJ times to converge its level to that of the approximate
41  expected signal level for symbol s */
```

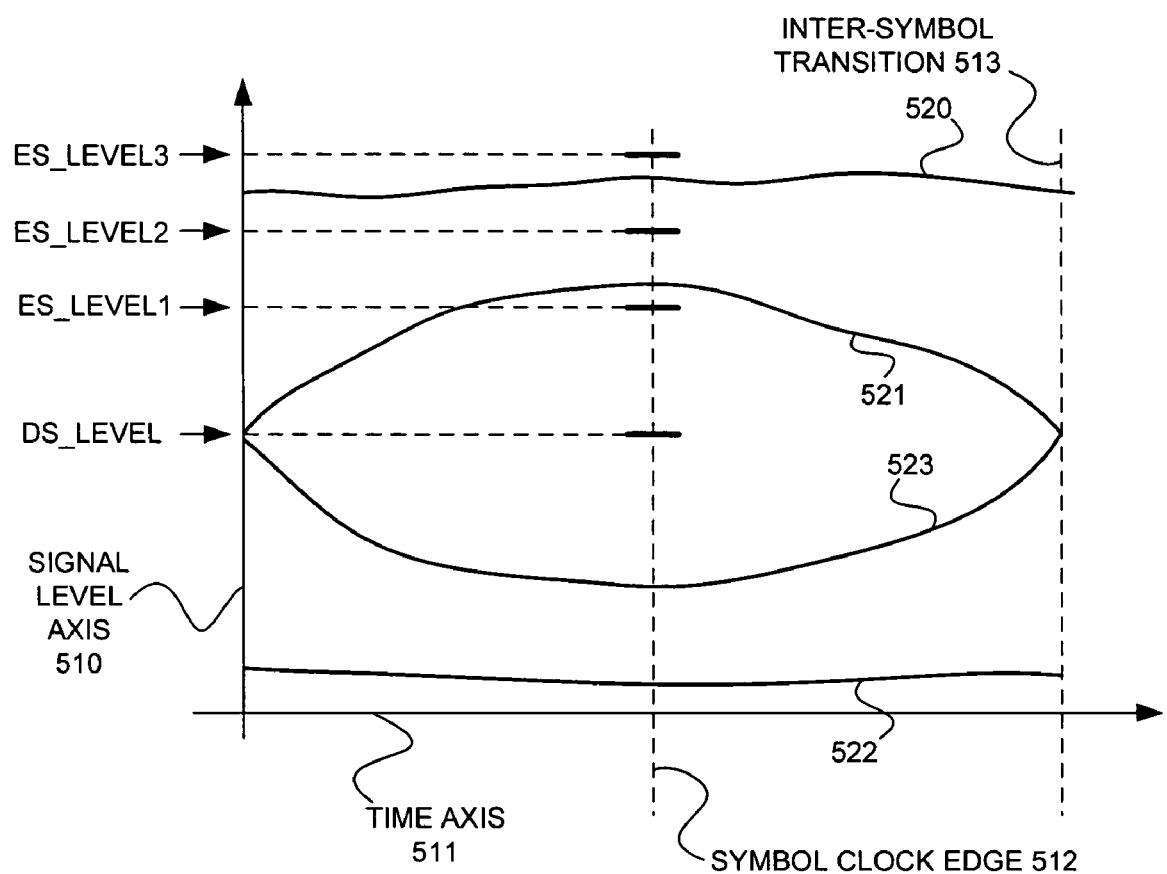

BINARY DATA "EYE"

METHOD AND APPARATUS FOR TAIL CANCELLATION EQUALIZATION

FIELD OF THE INVENTION

The present invention relates generally to filters for equalization of signals, and more particularly to receive equalizers.

BACKGROUND OF THE INVENTION

In high-speed data communications systems, one of the major limitations to the rate at which data can be reliably transmitted through a channel is the band-limited nature of the channel. The band-limiting of the channel produces a low pass filtering effect that results in symbols being dispersed in time at the receiver. The time dispersal can cause symbols to overlap. For example, the trailing edges (or "tails") of preceding symbols can overlap the designated time slot of a succeeding symbol. The overlapping effect is termed Inter-Symbol Interference (ISI) and can result in significant "eye-opening" reduction (where eye-opening is a measure of data reception reliability) at the receiver.

An approach to mitigating ISI is to include a linear equalizer in the receiver. Linear equalizers can operate as follows. The high-frequency part of an input signal is separated out, amplified and then added back to the input signal. In this way, the high-frequency portion of the input signal receives greater gain relative to the lower frequencies.

A limitation of the linear equalizer approach, however, are the high-gain, wide-band, amplifiers used to gain-up the high-frequency portion of the input signal. It is difficult to realize accurate equalization with such amplifiers because of such factors as: phase mismatch between the input and high-frequency, gained-up, signal paths; and difficulty controlling the RC time constant at the input of the high-frequency amplifiers. Additionally, high-frequency amplifiers can consume significant power and accentuate high-frequency noise sources (such as crosstalk).

Thus, while it is desirable to have receiver equalization, it is difficult to do so in an accurate and power-efficient manner.

SUMMARY OF THE INVENTION

A signal 110 is an example pulse response of a channel, where the pulse that generates the pulse response (carrying, for example, a bit of information) is optimally sampled, for its information content, at the time of a clock pulse n. A pulse response 110, without equalization, can significantly effect bit values to be sampled at the times of succeeding sample clocks (e.g., bits to be sampled at the times of clock pulses n+1 to n+6). The portion of pulse response 110, at the sample times for succeeding symbols of information, can be referred to as the "tail."

A signal 111 is a low-pass filtering of pulse response 110 that is designed to provide a good approximation of the tail of pulse response 110.

Subtracting signal 111 from pulse response 110 can produce difference a signal 112. Like pulse response 110, difference signal 112 carries the correct information value at the time of clock n. Unlike pulse response 110, however, difference signal 112 can be substantially closer to zero at the times of the succeeding sample clocks.

Thus, subtraction of a signal 111 from a pulse response 110, where signal 111 provides a good approximation of the tail of pulse response 110, can provide a method for canceling the tail of pulse response 110.

While the above discussion is presented in terms of canceling the tail of an isolated pulse, tail cancellation equalization can be applied to a continuous data stream using a feedback system.

Signals at an input X(t), an output 223 and an output Y(t) correspond to, respectively, signals 110, 111 and 112. The signal at X(t) differs from signal 110 in its being a continuous stream of arbitrary data. The signal at output 223 differs from signal 111 in its being the low pass filtering of X(t). Such low pass filtering can be accomplished by a unit referred to as LPF 211. The signal at output Y(t) differs from signal 112 in its being a continuous stream of equalized arbitrary data, produced by subtracting the signal at output 223 from X(t). The subtraction can be accomplished with a summer 212.

A measurement unit 213, analysis unit 214 and decision unit 215 can act to continuously adapt LPF 211 such that tail cancellation equalization is continuously achieved.

Measurement unit 213 can construct, from Y(t), a set of correlation measurements referred to herein as PR_Y. An example array, PR_Y(0) to PR_Y(6), is discussed herein. These correlation measurements are sufficiently similar to the pulse response of the channel such that they can be used to adapt the equalization provided by LPF 211 and summer 212. Specific procedures for collection of the correlation measurements are discussed. In general, each correlation measurement is reflective of both ISI and any other noise sources present in the channel. For each correlation measurement, the ISI it reflects is chosen to be that of a data symbol that is k symbol times earlier than a symbol at the relative symbol time n, where the correlation measurement is referred to as PR_Y(k). The noise sources, other than ISI, are the same for each correlation measurement. Thus, the value of each correlation measurement, relative to any other correlation measurement, is reflective only of the extent to which its value is determined by its chosen ISI source.

Measurement unit 213 can produce PR_Y at an output 232. Analysis unit 214 can analyze PR_Y for certain characteristics and decision unit 215 can decide to adjust LPF 211 depending upon the values of the characteristics.

Analysis unit 214 can analyze the "tail" of the PR_Y (the tail of PR_Y referred to herein as "PR_Y_tail"). Analysis unit 214 can analyze PR_Y_tail for the following characteristics: slope and area. Further details, of an embodiment of analysis unit 214, are presented.

Decision unit 215 can provide feedback control to LPF 211, at an output 231, directed to achieving the following goal: a PR_Y_tail whose slope and area are zero. PR_Y is sufficiently similar to the pulse response such that when a setting of LPF 211 causes the slope and area of PR_Y_tail to be zero, the slope and area of the tail of the pulse response are also caused to be zero.

LPF 211 can be implemented as a first order LPF. Detailed discussion of the operation of LPF 211 as a first order filter is presented.

Decision unit 215 can be a digital machine that can decide to adjust the pole frequency $\omega_p$ of LPF 211 on the basis of the slope measurement and can decide to adjust the gain $\alpha$ of LPF 211 on the basis of the area measurement. An example decision procedure 300, for decision unit 215, is presented.

TCE can be used in conjunction with other equalization techniques. For example, tail cancellation equalization can be used in conjunction with decision feedback equalization (DFE).

LPF 211 can provide analog signal processing between its input 222 and output 223. LPF 211 can have a gain input 224 and pole frequency input 225. Gain input 224 and pole frequency input 225 can each be made to accept a digital control word by coupling each to a DAC. The analog output of each DAC can be coupled to control the analog signal processing of LPF 211 that performs the low pass filtering. In this way, LPF 211 can be digitally controlled while still using analog signal processing.

A transfer function for a TCE system, in the frequency domain, is presented.

LPF 211 and summer 212 can be integrated on the same physically contiguous integrated circuit, referred to herein as the "Receiver IC." Measurement unit 213, analysis unit 214 and decision unit 215 can be included on the Receiver IC. Alternative implementations for these units are presented. Measurement unit 213 can be divided into two sub-components: a sampling unit 218 and a correlation engine 219. Alternative implementations for these units are also presented.

Interaction between correlation engine 219, analysis unit 214 and decision unit 215 can proceed as follows: correlation engine 219 can update the values for the relative ISI measurements; analysis unit 214 can use the updated values to determine new values for slope and area; decision unit 215 can use the new values from analysis unit 214 to update the pole and gain for LPF 211.

Further details, of measurement unit 213, analysis unit 214 and decision unit 215, are presented.

Measurement unit 213 can determine a value for PR_Y(k) by determining a correlation between the value of Y(t) at the time of a sample clock n and the value of Y(t) at the time of an earlier sample clock n−k.

Determination of this correlation as a formula is presented. The formulas presented depend upon the use of data and error slicers.

For the case where Y(t) is encoded with binary data, the data slicer's threshold can be set to a level half-way between the approximate expected signal level for a logic one (assuming no ISI or other noise) and the approximate expected signal level for a logic zero (assuming no ISI or other noise).

For the case where Y(t) is encoded with binary data, one error slicer's threshold can be set to an approximate expected signal level for a logic one and another error slicer can be set to an approximate expected signal level for a logic zero. An iterative process for setting the threshold of an error slicer is presented.

A slicer can have its threshold (referred to herein as "error_slicer_threshold") set to a level approximating the expected signal level of a symbol s by an iterative process. Pseudo-code, for such an iterative process, is presented.

The subtraction performed by summer 212 can be realized with a sampling capacitor.

BRIEF DESCRIPTION OF THE DRAWINGS

The accompanying drawings, that are incorporated in and constitute a part of this specification, illustrate several embodiments of the invention and, together with the description, serve to explain the principles of the invention:

FIG. 1A depicts an equalization technique, referred to herein as "tail cancellation" (TCE).

FIG. 1B depicts correlation measurements that are representative of the pulse response of the channel.

FIG. 4A depicts pseudocode for an iterative process to set the threshold of an error slicer.

FIG. 4B depicts pseudocode for an iterative process, to set the threshold of an error slicer, that repeats a predetermined number of times.

FIG. 5A shows a "data eye" for binary data.

DETAILED DESCRIPTION OF PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

Table of Contents to Detailed Description

| | |
|---|---|
| 1. | Overview of Tail Cancellation Equalization |
| 1.1. | Applied to Isolated Pulse |
| 1.2. | Applied to Continuous Data Stream |
| 1.2.1. | Generic LPF Utilized |
| 1.2.2. | First Order LPF Utilized |
| 2. | Further Details |
| 2.1. | Hybrid Equalization |
| 2.2. | LPF 211 |
| 2.3. | Units 213, 214 and 215 |
| 2.3.1. | Measurement Unit 213 |
| 2.3.1.1. | Units 218 and 219 |
| 2.3.1.2. | Error Slicer Threshold |
| 2.3.2. | Analysis Unit 214 |
| 2.3.3. | Decision Unit 215 |
| 2.4. | Summer 212 |
| 3. | Glossary of Selected Terms |

1. Overview of Tail Cancellation Equalization

1.1. Applied to Isolated Pulse

FIG. 1A depicts an equalization technique, referred to herein as "tail cancellation" (TCE).

Signal 110 is an example pulse response of a channel, where the pulse that generates the pulse response (carrying, for example, a bit of information) is optimally sampled, for its information content, at the time of a clock pulse n (the time of clock pulse n indicated in FIG. 1A by a vertical edge labeled "$SCE_n$," where SCE stands for "Sample Clock Edge"). Pulse response 110, without equalization, can significantly effect bit values to be sampled at the times of succeeding sample clocks (e.g., bits to be sampled at the times of clock pulses n+1 to n+6). The portion of pulse response 110, at the sample times for succeeding symbols of information, can be referred to as the "tail."

Signal 111 of FIG. 1A depicts an example low-pass filtering of pulse response 110 that is designed to provide a good approximation of the tail of pulse response 110.

Subtracting signal 111 from pulse response 110 can produce difference signal 112. Like pulse response 110, difference signal 112 carries the correct information value at the time of clock n. Unlike pulse response 110, however, difference signal 112 is substantially closer to zero at the times of the succeeding sample clocks.

Thus, subtraction of signal 111 from pulse response 110, where signal 111 provides a good approximation of the tail of pulse response 110, can provide a method for canceling the tail of pulse response 110.

FIG. 1A includes an example symbol stream 101, temporally aligned with pulse response 110 such that symbol $D_n$ occurs during the optimal sampling time of pulse response 110. Symbol stream 101 illustrates how the pulse response of a symbol $D_n$ can effect six symbols (i.e., $D_{n+1}$ to $D_{n+6}$) that follow $D_n$.

1.2. Applied to Continuous Data Stream 1.2.1. Generic LPF Utilized

Figure 2A:
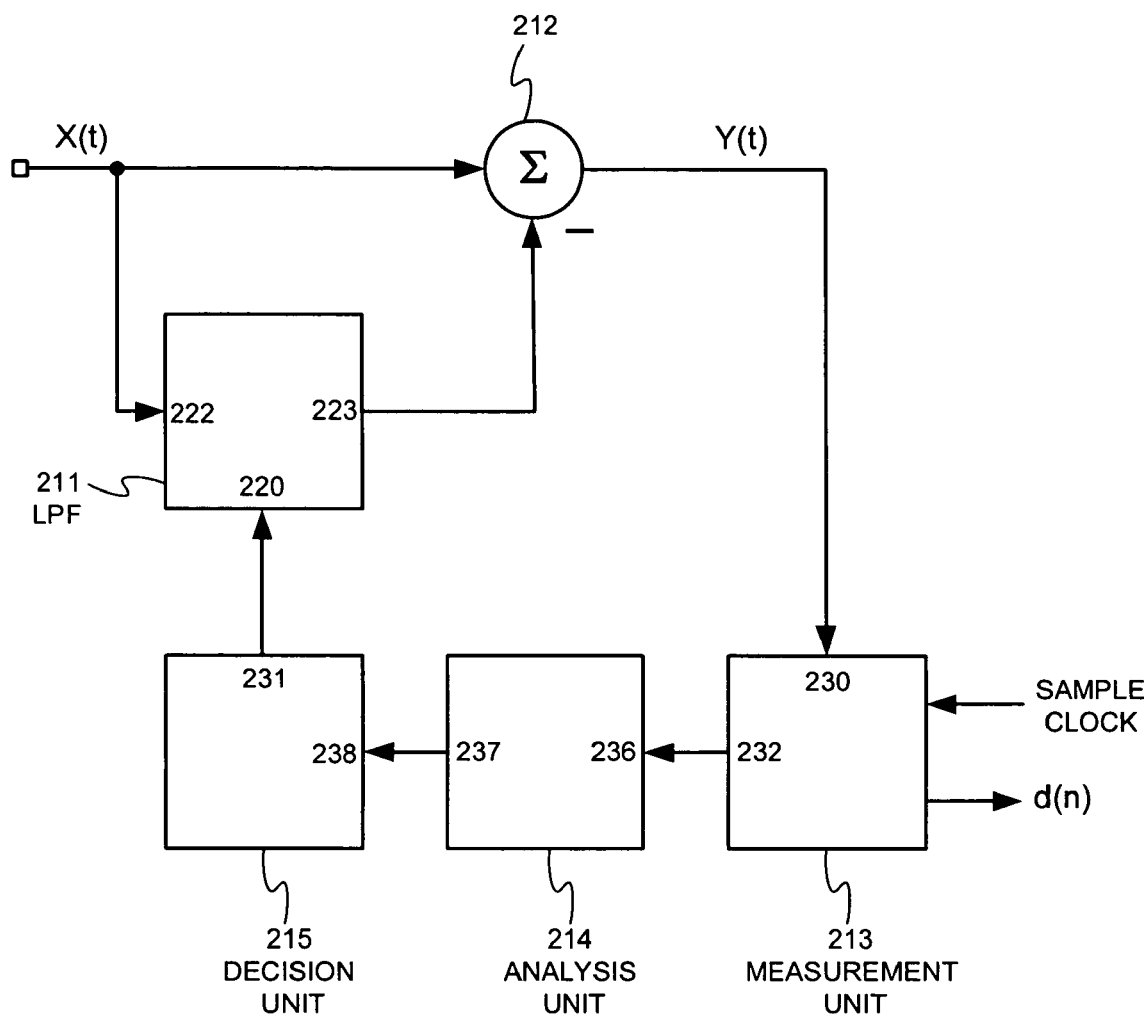
FIG. 2A presents tail cancellation equalization applied to a continuous data stream by using a feedback system.

While FIG. 1A is presented in terms of canceling the tail of an isolated pulse, tail cancellation equalization can be applied to a continuous data stream using a feedback system as shown in FIG. 2A.

In FIG. 2A, the signals at input X(t), output 223 and output Y(t) in FIG. 2A correspond to, respectively, signals 110, 111 and 112 of FIG. 1A. The signal at X(t) differs from signal 110 in its being a continuous stream of arbitrary data. The signal at output 223 differs from signal 111 in its being the low pass filtering of a continuous stream of arbitrary data. The signal at output Y(t) differs from signal 112 in its being a continuous stream of equalized arbitrary data. The data at Y(t) can be used by any receiving system. For example, the receiving system can be a backplane transceiver or a hard disk drive controller.

Measurement unit 213, analysis unit 214 and decision unit 215 can act to continuously adapt LPF 211 such that tail cancellation equalization is continuously achieved.

Measurement unit 213 can construct, from Y(t), an array of correlation measurements referred to herein as PR_Y. An example array, PR_Y(0) to PR_Y(6), is discussed herein. These correlation measurements are sufficiently similar to the pulse response of the channel such that they can be used to adapt the equalization of LPF 211 and summer 212. Specific procedures for collection of the correlation measurements are discussed below (see Section 2.3.1 "Measurement Unit 213"). In general, however, each correlation measurement is reflective of both ISI and any other noise sources present in the channel. For each correlation measurement, the ISI it reflects is chosen to be that of a data symbol that is k symbol times earlier than a symbol at the relative symbol time n, where the correlation measurement is referred to as PR_Y(k). The noise sources, other than ISI, are the same for each correlation measurement. Thus, the value of each correlation measurement, relative to any other correlation measurement, is reflective only of the extent to which its value is determined by its chosen ISI source.

A correlation measurement PR_Y(k) is the same as a sample of the pulse response of a symbol occurring k symbol times (or sample clocks) earlier than a symbol time n in at least the following ways. The correlation measurement and the pulse response sample have the same sign. If a first correlation measurement is greater than a second correlation measurement, then the first pulse response sample (corresponding to the first correlation measurement) is greater than the second pulse response sample (corresponding to the second correlation measurement).

Measurement unit 213 produces PR_Y at output 232. An example PR_Y, PR_Y(n) for n from 0 to 6, is shown in FIG. 1B. To depict a possible relationship between the correlation measurements and the pulse response, a pulse response of the channel is shown in FIG. 1B as equalized signal 112. To depict a possible relationship between the correlation measurements and a symbol stream, a symbol stream 102 is shown. PR_Y(0) is shown as corresponding to the optimal sampling time for a symbol $D_0$. Each other PR_Y(n), for n from 1 to 6, is shown as corresponding to the relative ISI effect of $D_0$ upon a symbol $D_n$.

Analysis unit 214 can accept PR_Y at an input 236, analyze PR_Y for certain characteristics, and then make the values of those characteristics available at an output 237. Decision unit 215 can receive the characteristics' values at an input 238 and decide to adjust LPF 211 depending upon the values of the characteristics.

Analysis unit 214 can analyze the "tail" of the PR_Y (the tail of PR_Y referred to herein as "PR_Y_tail"). If PR_Y is represented by the values of FIG. 1B, an example PR_Y_tail can be values PR_Y(1) to PR_Y(6). Analysis unit 214 can analyze PR_Y_tail for the following characteristics: slope and area. With regard to slope measurement, a PR_Y_tail whose values are more positive with increasing time has positive slope, while a tail whose values are more negative with increasing time has negative slope. With regard to area determination, if as much of a PR_Y_tail is below the horizontal axis as is above, the positive and negative areas cancel out, leading to an area measurement of zero. Further details, of an embodiment of analysis unit 214, are presented in the below section 2.3.2: "Analysis Unit 214."

Decision unit 215 can provide feedback control to LPF 211, at its output 231, directed to achieving the following goal: a PR_Y_tail whose slope and area are zero. PR_Y is sufficiently similar to the pulse response such that when a setting of LPF 211 causes the slope and area of PR_Y_tail to be zero, the slope and area of the tail of the pulse response are also caused to be zero.

1.2.2. First Order LPF Utilized

Figure 2B:
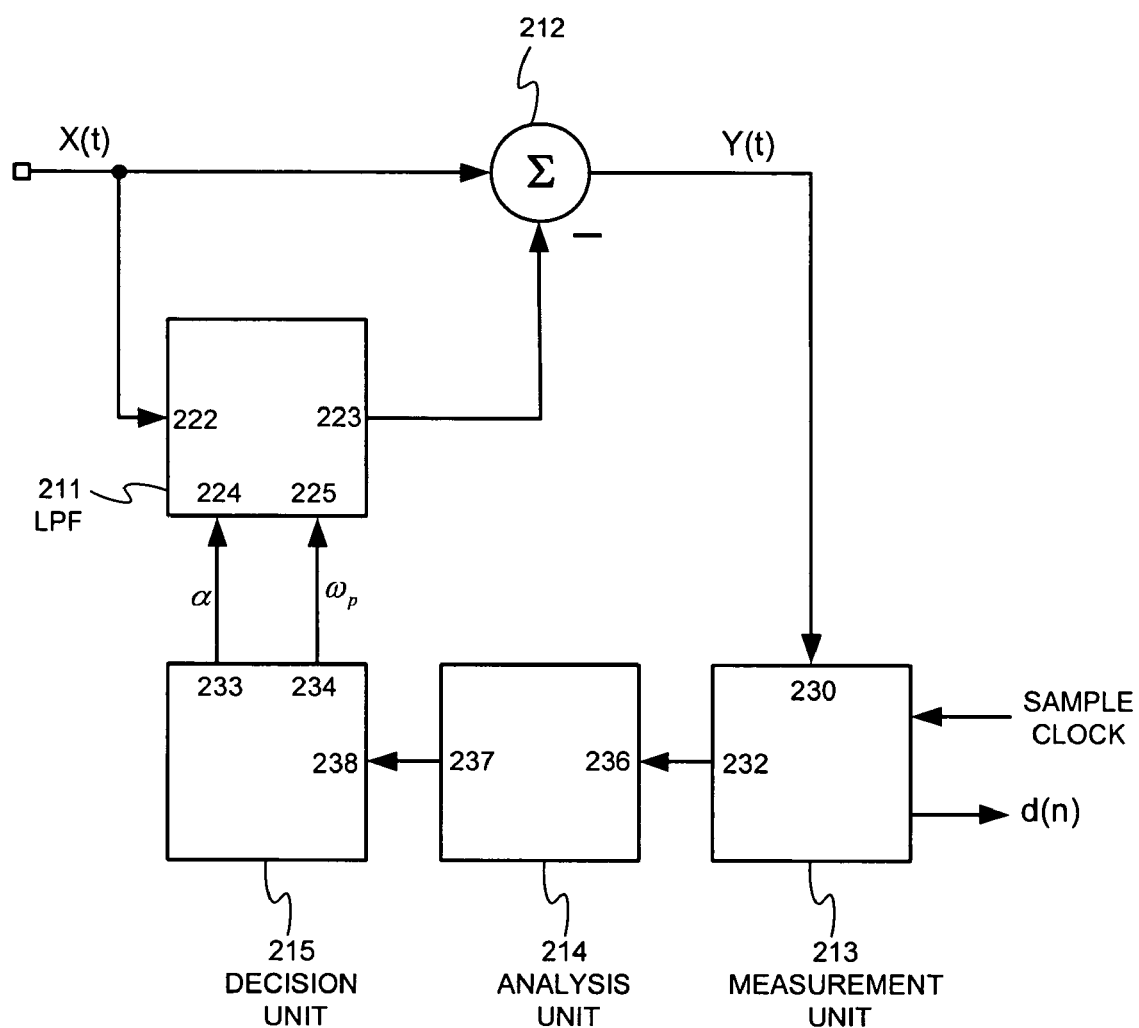
FIG. 2B depicts the implementation of FIG. 2A, except that LPF 211 is implemented as a first order LPF.

FIG. 2B depicts the implementation of FIG. 2A, except that LPF 211 is implemented as a first order LPF. Detailed discussion of the operation of LPF 211 as a first order filter is in section 2.2: "LPF 211." FIG. 2B operates as follows.

Figure 3:
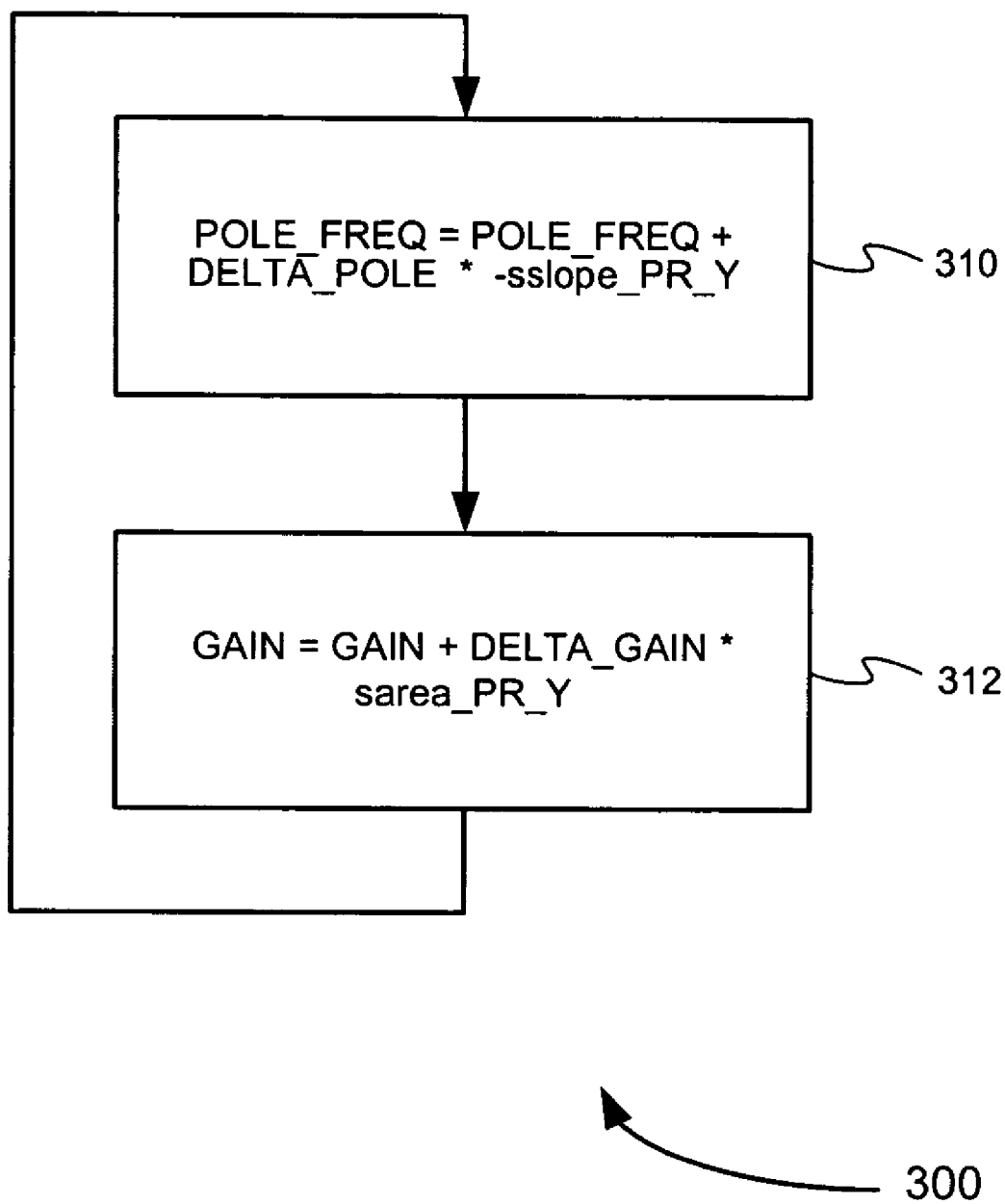
FIG. 3 shows an example decision procedure 300 for a decision unit 215.

Decision unit 215 can be a digital machine that can decide to adjust the pole frequency $\omega_p$ of LPF 211 on the basis of the slope measurement and can decide to adjust the gain $\alpha$ of LPF 211 on the basis of the area measurement. An example decision procedure 300, for decision unit 215, is shown in FIG. 3.

Decision procedure 300 is based upon analysis unit 214 providing two items of information: the sign of the current slope of PR_Y tail (referred to herein as "sslope_PR_Y") and the sign of the current area of PR_Y_tail (referred to herein as "sarea_PR_Y"). The set of potential values, for each of sslope_PR_Y and sarea_PR_Y, is: {−1,0,+1}. Decision procedure 300 can be a continuous loop to update variables "POLE_FREQ" and "GAIN," where the value of POLE_FREQ is output at 234 to control the pole frequency of LPF 211 and the value of GAIN is output at 233 to control the gain of LPF 211. The strategy of decision procedure 300 is as follows.

For step 310, each time sslope_PR_Y is found to be negative, POLE_FREQ is increased by a unit increment (referred to herein as "DELTA_POLE") and each time sslope_PR_Y is found to be positive, POLE_FREQ is decreased by the unit increment DELTA_POLE. Step 310 represents this functionality as an assignment statement that first sets DELTA_POLE to the same sign as sslope_PR_Y and then adds it to POLE_FREQ. The iterative expression solved by step 310 is:

POLE_*FREQ*=POLE_*FREQ*+DELTA_POLE*−sslope_*PR*_*Y*

For step 312, each time sarea_PR_Y is found to be positive, GAIN is increased by a unit increment (referred to herein as "DELTA_GAIN") and each time sarea_PR_Y is found to be negative, GAIN is decreased by the unit increment DELTA_GAIN. Step 312 represents this functionality as an assignment statement that first sets DELTA_GAIN to the same sign as sarea_PR_Y and then adds it to GAIN. The iterative expression solved by step 312 is:

GAIN=GAIN+DELTA_GAIN*sarea_PR_Y

2. Further Details 2.1. Hybrid Equalization

TCE can be used in conjunction with other equalization techniques. For example, tail cancellation equalization can be used in conjunction with decision feedback equalization (DFE).

Referring to FIG. 1B, DFE can be used to address ISI between a symbol at a clock sample time represented by PR_Y(0) and a symbol at the time of clock represented by PR_Y(1), while TCE can be used to address ISI between a symbol at the time of a clock represented by PR_Y(0) and the symbols at the times of clocks represented by PR_Y(2) to PR_Y(6).

2.2. LPF 211

LPF 211 can be a first order filter whose operation that, in the frequency domain, can be modeled by the following expression:

$$\frac{\alpha \omega_p}{S + \omega_p}$$

where $\alpha$ is the gain and $\omega_p$ is the pole frequency. FIG. 2B depicts the equalization system of FIG. 2A, where a first order LPF is utilized.

LPF 211 can provide analog signal processing between its input 222 and output 223. LPF 211 can have a gain input 224 and pole frequency input 225. Gain input 224 and pole frequency input 225 can each be made to accept a digital control word by coupling each to a DAC. The analog output of each DAC can be coupled to control the analog signal processing of LPF 211 that performs the low pass filtering. In this way, LPF 211 can be digitally controlled while still using analog signal processing.

A transfer function for FIG. 2B, in the frequency domain, can be expressed by the following equation:

$$Y(S) = X(S) - X(S)\frac{\alpha \omega_p}{S + \omega_p}$$

The above equation can also be expressed in the following form:

$$Y(S) = X(S)\frac{S + \omega_p}{S + \omega_p} - X(S)\frac{\alpha \omega_p}{S + \omega_p}$$

which can be simplified to the following:

$$Y(S) = X(S)\frac{S + (1 - \alpha)\omega_p}{S + \omega_p}$$

2.3. Units 213, 214 and 215

LPF 211 and summer 212 can be integrated on the same physically contiguous integrated circuit, referred to herein as the "Receiver IC." Measurement unit 213, analysis unit 214 and decision unit 215 can be included on the Receiver IC. Alternatively, analysis unit 214 and decision unit 215 can be implemented in hardware separate from the Receiver IC. Part of measurement unit 215 can be implemented in hardware separate from the Receiver IC. Specifically, measurement unit 213 can be divided into two sub-components (see FIG. 2C): sampling unit 218 and correlation engine 219. Correlation engine 219 can be implemented in hardware separate from the Receiver IC while sampling unit 218 can be included on the Receiver IC.

Correlation engine 219, analysis unit 214 and decision unit 215 can perform their processing with at least part of their hardware dedicated to their specific functionality, or general purpose computing hardware can be used.

Interaction between correlation engine 219, analysis unit 214 and decision unit 215 can proceed as follows: correlation engine 219 can update the values for the relative ISI measurements; analysis unit 214 can use the updated values to determine new values for slope and area; decision unit 215 can use the new values from analysis unit 214 to update the pole and gain for LPF 211.

Further details, of measurement unit 213, analysis unit 214 and decision unit 215, are discussed below.

2.3.1. Measurement Unit 213

Measurement unit 213 can determine a value PR_Y(k) by determining a correlation between the value of Y(t) at the time of a sample clock n and the value of Y(t) at the time of a earlier sample clock n−k. In order to express the determination of this correlation as a formula, functions d(n), es(n,s) and e(n,s) are first defined.

Function d(n) identifies the type of symbol encoded in Y(t) at the time of sample clock n. The function of d(n) can be accomplished with a slicer or slicers, depending upon the type of encoding. For the case where Y(t) is encoded with binary data, a slicer's threshold can be set to a level half-way between the approximate expected signal level for a logic one (assuming no ISI or other noise) and the approximate expected signal level for a logic zero (assuming no ISI or other noise). If the value measured by the slicer is above its threshold, d(n)=+1, while if the value measured by the slicer is below its threshold, d(n)=−1. The slicer or slicers for accomplishing d(n) can be referred to as a data slicer or slicers.

Function es(n,s) identifies whether Y(t), at the time of a sample clock n, is above or below the approximate expected signal level for a particular symbol s (assuming no ISI or other noise). The function of es(n,s) can be accomplished with multiple adjustable slicers or a single adjustable slicer. The slicer or slicers used to accomplish es(n,s) can be referred to as an error slicer or slicers. For the case where Y(t) is encoded with binary data, one error slicer's threshold can be set to an approximate expected signal level for a logic one (in which case the slicer handles the case es(n,s=1)) and another error slicer can be set to an approximate expected signal level for a logic zero (in which case the other slicer handles the case es(n,s=0)). If the value measured by an error slicer is above its threshold, es(n,s)=+1 and if the value measured by the error slicer is below its threshold, es(n,s)=−1. An iterative process for setting the threshold of an error slicer is presented in below section 2.3.1.2: "Error Slicer Threshold."

Function e(n,s) can perform two tests: whether the symbol specified by s is present in Y(t) at the time of sample clock n and, if the tested-for symbol is present, whether the symbol is present at a signal level that is above or below its expected signal level. If the tested-for symbol is not present, e(n,s)

returns zero. If the tested-for symbol is present, e(n,s) returns the same value as es(n,s).

For the case where Y(t) encodes binary data, e(n, s) can operate as follows. For e(n,s=1), if d(n)=+1, return the value determined by es(n,s=1), otherwise return zero. For e(n, s=0), if d(n)=−1, return the value determined by es(n,s=0), otherwise return zero. For FIG. 2C, e(n,s) can be implemented as part of correlation engine 219 using the slicer inputs 234 and 235.

Expressed as a formula, a correlation value can be determined as follows:

$$PR\_Y(k) = \sum_{n=x}^{n=x+c} \left[ e\left(n, \frac{d(n)+1}{2}\right) \times d(n-k) \right]$$

The above formula determines a value for PR_Y, at a relative time k, as a sum of c+1 product terms. Each product term is based upon measurement of Y(t) at the times of sample clocks n and n−k. For the case where Y(t) encodes binary data, this admits of four possibilities: i) d(n)=−1, d(n−k)=−1; ii) d(n)=+1, d(n−k)=+1; iii) d(n)=−1, d(n−k)=+1; or iv) d(n)=+1, d(n−k)=−1.

For the case where Y(t) encodes binary data, the above formula relies upon two slicers being available for the measurement at time n: one for e(n,s=0) and another for e(n,s=1). If only one slicer is available for this measurement, the correlation can still be found with either one of the two following formulas (which have the disadvantage of accumulating a correlation sum more slowly):

$$PR\_Y(k) = \sum_{n=x}^{n=x+c} [e(n, s=1) \times d(n-k)]$$

$$PR\_Y(k) = \sum_{n=x}^{n=x+c} [e(n, s=0) \times d(n-k)]$$

With the above two formulas, for those measurements at the time of a sample clock n where the appropriate symbol is not present, e(n,s) returns zero and the product term does not effect the correlation sum.

2.3.1.1. Units 218 and 219

As discussed above, FIG. 2C presents an embodiment for measurement unit 213 that is divided into two main subsections: sampling unit 218 and correlation engine 219.

Figure 2C:
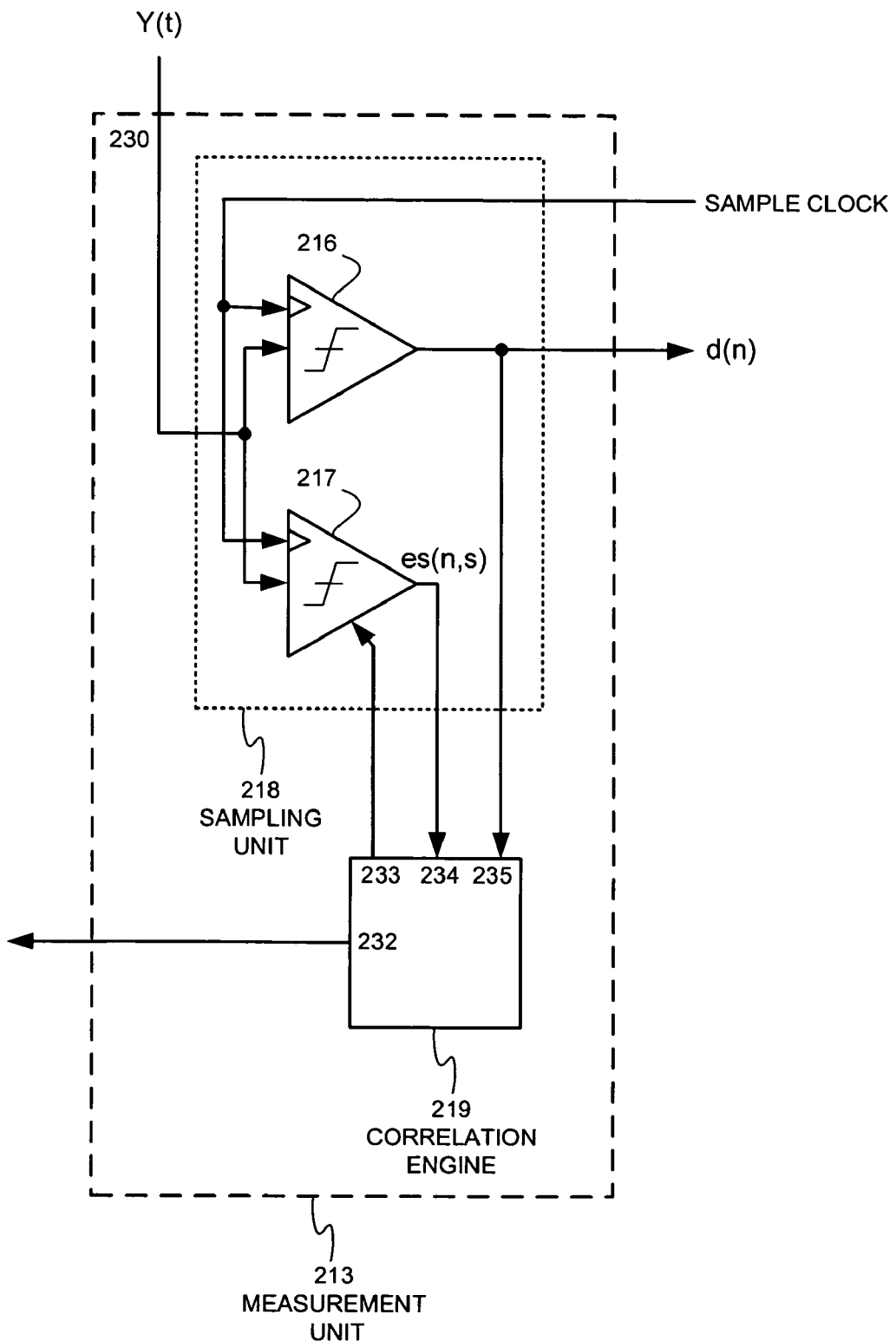
FIG. 2C depicts measurement unit 213 as comprising a sampling unit 218 and correlation engine 219.

Sampling unit 218 can contain a data slicer 216 and an error slicer 217. The output of data slicer 216 provides d(n) (as discussed above) and also drives an input 235 to correlation engine 219. The output of error slicer 217 provides es(n,s) (as discussed above) and drives an input 234 to correlation engine 219. Both slicers 216 and 217 receive Y(t) as an input and compare a discrete signal level of Y(t) to a reference level (reference level not shown). The reference level for data slicer 216 can be fixed, while the reference level for error slicer 217 is adjustable. In FIG. 2C, error slicer 217 is shown as having a reference level adjusted by an output 233 of correlation engine 219. Both slicers are clocked by a sample clock such that the received, equalized, signal of Y(t) is sampled at the correct times. d(n) is shown as an output in FIG. 2C that provides a receiving system (receiving system not shown) with the received data. Examples of receiving systems are a backplane transceiver or a hard disk drive controller.

2.3.1.2. Error Slicer Threshold

A slicer, such as 217 of FIG. 2C, can have its threshold (referred to herein as "error_slicer_threshold") set to a level approximating the expected signal level of a symbol s by an iterative process of the type shown in FIG. 4A. FIG. 4A presents pseudo-code loosely based on the C programming language. The C programming language is described in such texts as "A Book on C," by A. Kelley and 1. Pohl, Benjamin Cummings Pub. Co., Third Edition, 1995, ISBN 0-8053-1677-9, herein incorporated by reference in its entirety.

Assume the error slicer, whose threshold to be set, can be set to a threshold level by setting the variable error_slicer_threshold of FIG. 4A. Initially, error_slicer_threshold can be set to an initial level (line 2).

An outer loop is then begun (loop-back point is the label "Repeat" at line 5) that determines the number of times the error slicer's threshold is adjusted.

An inner loop (lines 11–22) is prepared for by initializing the inner loop counter (line 5) and initializing the sum of error slicer values to zero (line 7).

The inner loop is executed until it has taken MAX_NUM_CORRS measurements of a symbol s. The inner loop operates as follows.

The function "wait_for_symbol_clock" (FIG. 4A, line 15) waits for a symbol clock n and then assigns values to "data_slicer_value" and "error_slicer_value." The value assigned to "data_slicer_value" represents a value returned by reading a data slicer at the time of clock n and the value assigned to "error_slicer_value" represents a value returned by a reading of the error slicer at the time of clock n. The error slicer returns a +1 if the signal level of a symbol s, at the time of symbol clock at the time of clock n, is above that of the error slicer's threshold. The error slicer returns a −1 if the signal level of a symbol s, at the time of symbol clock at the time of clock n, is below that of the error slicer's threshold.

If the symbol just captured by wait_for_symbol_clock is the symbol s (a condition test for by line 17), whose approximate expected signal level is sought, the following occurs. The symbol is counted towards the total number of s symbols that form the basis of the next error slicer adjustment (line 19, where inner loop index is incremented). The error slicer's value is accumulated in e_to_s_corr (line 20).

Once the inner loop completes, the value of e_to_s_corr is tested. If e_to_s_corr is close to zero, then it is known that the error slicer produced approximately as many +1's as −1's given its current threshold. The error slicer producing an approximately equal number of +1's as −1's indicates error_slicer_threshold is set to the approximate expected signal level for s.

In FIG. 4A, e_to_s_corr does not sufficiently approximate zero if either e_to_s_corr is greater than an "upper_bound" (line 24) or less than a "lower_bound" (line 30).

If e_to_s_corr is greater than an "upper_bound," the number of +1's is decreased, during a subsequent execution of the inner loop, by increasing error_slicer_threshold by an amount delta (line 26). A "goto" is then executed to continue another iteration of the outer loop (line 27). If e_to_s_corr is less than a "lower_bound," the number of −1's is decreased, during a subsequent execution of the inner loop, by decreasing error_slicer_threshold by an amount delta (line 32). In this case as well, a "goto" is then executed to continue another iteration of the outer loop (line 33).

In FIG. 4A, if e_to_s_corr does sufficiently approximate zero, the outer loop "falls through" to line 36. At this point, the error slicer has been set to the approximate expected signal level for symbol s and this value can be used accordingly.

While FIG. 4A permits upper_bound and lower_bound to have different values, depending upon the problem situation, upper_bound and lower_bound can be set to the same value (e.g., zero), or upper_bound can be greater than the lower_bound (e.g., upper_bound>0 and lower_bound<0).

The procedure of FIG. 4A repeats until a convergence criterion for error_slicer_threshold has been met (e.g., the procedure of FIG. 4A executes until error_slicer_threshold is not greater than upper_bound and error_slicer_threshold is not less than lower_bound). Alternatively, a procedure to converge on a value for error_slicer_threshold can repeat a predetermined number of times. FIG. 4B, for example, has the same inner loop (see lines 13–24 of FIG. 4B) as FIG. 4A. The outer loop of FIG. 4B, however, is executed a fixed number of times as determined by the value of MAX_NUM_ADJS.

The value for "delta," in a procedure to converge on a value for error_slicer_threshold, need not be fixed. For example, a delta, such as that shown in FIGS. 4A and 4B, can be a function of one or more variables. The set of one or more variables, that delta can be function of, can include the following: iteration step (e.g., the number of times a "Goto Repeat" has been executed) and the value of e_to_s_corr.

An example setting of an error slicer, for binary data, is described as follows. FIG. 5A shows a "data eye" for binary data. A data eye of this type can be produced, for example, with a digital sampling oscilloscope (DSO). The temporal extent of the data eye is that of a single binary symbol with the center of the data eye being the time point at which each binary symbol is sampled, by a symbol clock edge 512, to determine its data content.

The data eye has a binary one region which, in general, is any signal trace above DS_LEVEL as of the time of symbol clock edge 512. In FIG. 5A, all traces above DS_LEVEL are depicted as being further limited to being between traces 520 and 521. The binary zero region of the data eye is, in general, any signal trace below DS_LEVEL as of the time of symbol clock edge 512. In FIG. 5A, all traces below DS_LEVEL are depicted as being further limited to being between traces 522 and 523. These regions are due to such factors as inter-symbol interference and other noise sources. The binary one region includes all traces for which a binary "1" is received, while the binary zero region includes all traces for which a binary "0" is received.

DS_LEVEL, of FIG. 5A, indicates a threshold level of the data slicer at the time of symbol clock edge 512. A data slicer whose threshold is set to level DS_LEVEL correctly determines whether a symbol is a "1" or a "0" since traces that transmit a binary "1" are above DS_LEVEL and traces that transmit a binary "0" are below DS_LEVEL.

Three possible signal levels for the error slicer, at the time of symbol clock edge 512, are indicated in FIG. 5A by signal levels ES_LEVEL1, ES_LEVEL2 and ES_LEVEL3.

Figure 5B:
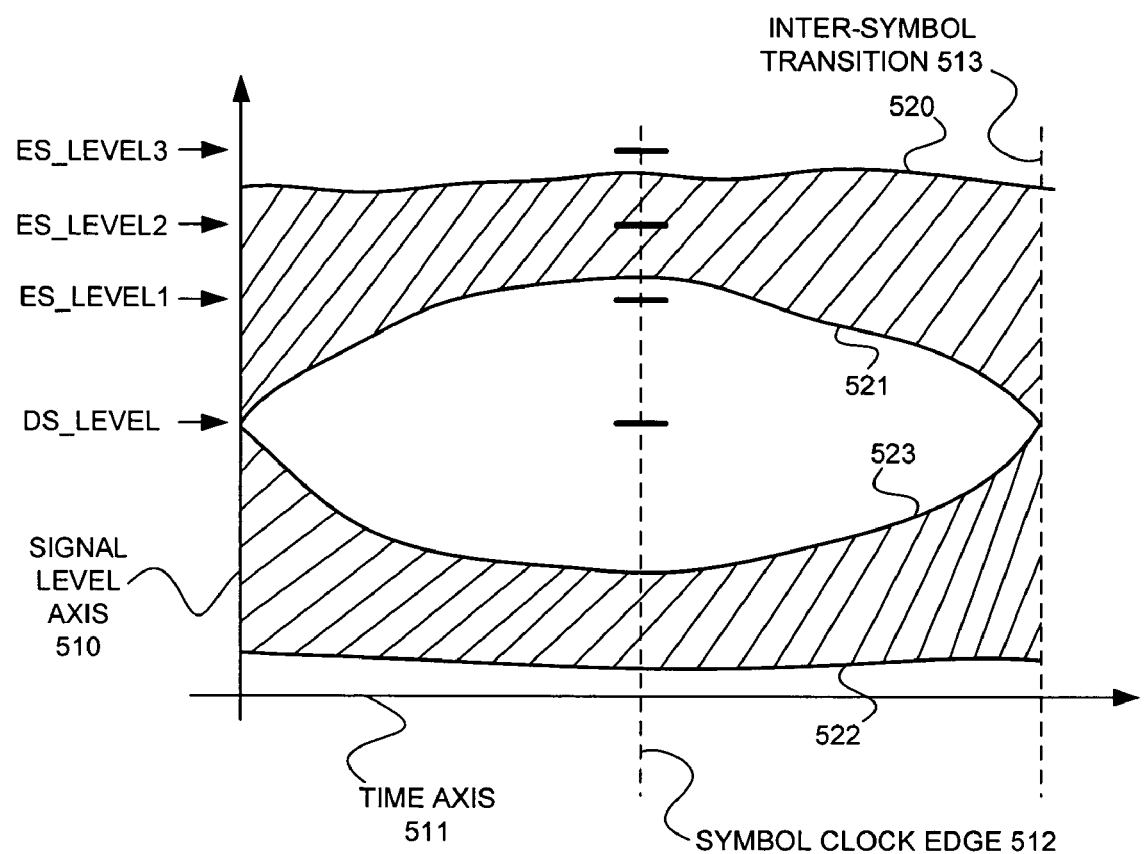
FIG. 5B is the same as FIG. 5A, except cross-hatching has been added to emphasize the regions corresponding to binary one and zero.

FIG. 5B is the same as FIG. 5A, except cross-hatching has been added between traces 520 and 521 and between traces 522 and 523. The cross-hatching emphasizes the region of binary one traces between 520 and 521 and the region of binary zero traces between 522 and 523.

If the error slicer is set to ES_LEVEL1 then (according to the above-described procedure of FIG. 4A or 4B), for all MAX_NUM_CORRS occurrences of symbol "1," the error slicer will produce a +1 for accumulation in e_to_s_corr. If the accumulated value for e_to_s_corr is too great (e.g., above upper_bound), then the level of the error slicer is increased (e.g., to ES_LEVEL2 or ES_LEVEL3).

If the error slicer is set to ES_LEVEL3 then, for all MAX_NUM_CORRS occurrences of the symbol "1," the error slicer will produce a −1 for accumulation in e_to_s_corr. If the accumulated value for e_to_s_corr is too small (e.g., below lower_bound), then the level of the error slicer is decreased (e.g., to ES_LEVEL2 or ES_LEVEL1).

If the error slicer is set to ES_LEVEL2 then the error slicer can be expected to sum a mixture of +1's and −1's into e_to_s_corr. If the accumulated value for e_to_s_corr is neither greater than upper_bound, nor smaller than lower_bound, the expected signal level of a binary "1" symbol has been sufficiently accurately approximated.

2.3.2. Analysis Unit 214

The sign of the slope of PR_Y_tail, sslope_PR_Y, can be determined as follows.

First, a general trend, as to whether a tail is rising or falling, referred to herein as slope_trend, can be determined by producing a first sum, of PR_Y values that represent later time intervals, a second sum, of PR_Y values that represent earlier time intervals, and subtracting the second sum from the first sum. For the example PR_Y of FIG. 1B, this can be accomplished by the following formula:

$$\text{slope\_trend} = [PR\_Y(6) + PR\_Y(5)] - [PR\_Y(3) + PR\_Y(2)]$$

The above equation assumes that DFE is used in conjunction with TCE, where DFE is applied to PR_Y(1). Thus, the above equation for slope does not include PR_Y(1). More generally slope_trend can be determined by the following formula:

$$\text{slope\_trend} = \left[\sum_{k=(PR\_Y\_pts-N)+1}^{PR\_Y\_pts} PR\_Y(k)\right] - \left[\sum_{m=M}^{M+(N-1)} PR\_Y(m)\right]$$

where:
- The left sigma determines the sum of values of the temporally later end of PR_Y while the right sigma determines the sum of values of the temporally earlier end of PR_Y.
- PR_Y_pts is one less than the total number of values in PR_Y to be analyzed. In the case of the PR_Y of FIG. 1B, PR_Y_pts=6.
- N is the number of sample points to be included from each end of the PR_Y array.
- M indicates the temporally earliest element of PR_Y from which to begin the summation of values at the temporally earlier end of PR_Y.

The above approach to determining slope_trend can be useful in cases where particular points of a PR_Y_tail deviate from the general trend of the tail's slope. In general, however, any approach, that reliably indicates whether a tail is rising or falling, can be used.

The sign of the slope_trend, referred to as sslope_PR_Y, can be produced by the following formula:

$$\text{sslope\_PR\_Y} = \text{sign\_func}(\text{slope\_trend})$$

where sign_func(arg) is defined as follows:

+1 if $arg > 0$

−1 if $arg < 0$ 0 if $arg = 0$

The sign of the area of PR_Y_tail, sarea_PR_Y, can be determined as follows.

First, the area of PR_Y_tail can be determined from the following equation:

$$\text{area\_PR\_Y} = \sum_{k=M}^{k=\text{PR\_Y\_pts}} \text{PR\_Y}(k)$$

where M has the same meaning defined above for slope_trend. As with the equation for slope, for the case where DFE is applied to PR_Y(1), M=2.

Second, the sign of the area is determined as follows:

$$\text{sarea\_PR\_Y} = \text{sign\_func}(\text{area\_PR\_Y})$$

2.3.3. Decision Unit 215

Other embodiments for Decision Unit 215 can include the following variations to the iterative equations for converging on optimized values of POLE_FREQ and GAIN:

varying the size of DELTA_POLE and/or DELTA_GAIN; and using the current slope and area of PR_Y_tail, rather than the sign of the tail's slope and area.

2.4. Summer 212

Subtraction of the output of LPF 211, by summer 212, can be realized with a sampling capacitor. Specifically, the signal at input X(t) can be sampled by a first plate of a sampling capacitor, with a second plate of the sampling capacitor connected to the output of LPF 211. In this way, the sample input to the slicer of measurement unit 213 is the difference between the first and second plates of a sampling capacitor. Such a sample implicitly includes the appropriate subtraction. However, any other method of performing the subtraction, implicitly or explicitly, can be used.

3. Glossary of Selected Terms

DAC: Digital to Analog Converter.
DFE: Decision Feedback Equalization.
ISI: Inter-Symbol Interference.
LPF: Low Pass Filter.
PR_Y: an array of correlation measurements of the signal at Y(t).
TCE: Tail Cancellation Equalization While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims and equivalents.

What is claimed is:

1. An equalization method, comprising:
   low-pass filtering an input data signal to produce a low-pass filtered signal;
   subtracting the low-pass filtered signal from the input data signal to produce an output data signal;
   determining correlation measurements, from the output data signal, that are representative of a pulse response; and
   determining an adjustment, to the low-pass filtering, from the correlation measurements, wherein determining the adjustment further comprises:
   analyzing the correlation measurements to determine a slope trend, and
   adjusting a pole frequency, of the low-pass filtering, on the basis of the slope trend.

2. The method of claim 1, wherein the low-pass filtering is performed by a first order filter.

3. The method of claim 1, wherein the subtracting is performed by a sampling capacitor.

4. The method of claim 1, wherein the step of subtracting comprises determination of a correlation.

5. The method of claim 4, wherein the step of determination of a correlation further comprises the following steps:
   thresholding, according to a first threshold, the output data signal at a first time of a first sample clock to produce a first value; and
   thresholding, according to a second threshold, the output data signal at a second time of a second sample clock to produce a second value.

6. The method of claim 5, wherein the first threshold is chosen to identify data symbols in the output data signal.

7. The method of claim 5, wherein the second threshold is chosen to identify a type of inter-symbol interference affecting a symbol represented in the output data signal at the second time.

8. The method of claim 5, further comprising the following steps:
   multiplying first value by the second value to produce a product;
   adding the product to a correlation sum.

9. The method of claim 1, wherein the step of analyzing the correlation measurements to determine a slope trend further comprises:
   determining a first sum of temporally later tail values;
   determining a second sum of temporally earlier tail values; and
   subtracting the second sum from the first sum.

10. The method of claim 1, wherein the step of determining an adjustment further comprises the following step:
    analyzing the correlation measurements to determine an area.

11. The method of claim 10, wherein the step of determining an adjustment further comprises the following step:
    adjusting a gain, of the low-pass filtering, on the basis of the area.

12. An equalization system, comprising:
    a sub-system configured to low-pass filter an input data signal to produce a low-pass filtered signal;
    a sub-system configured to subtract the low-pass filtered signal from the input data signal to produce an output data signal;
    a sub-system configured to determine correlation measurements, from the output data signal, that are representative of a pulse response; and
    a sub-system configured to determine an adjustment, to the low-pass filtering, from the correlation measurements, wherein determining the adjustment further comprises:
    analyzing the correlation measurements to determine a slope trend, and
    adjusting a pole frequency, of the low-pass filtering, on the basis of the slope trend.

* * * * *